July 14, 1964  G. E. CHILDS  3,140,906
APPARATUS FOR FLASHING LAMP FILAMENTS
Filed Feb. 14, 1961  6 Sheets-Sheet 1

INVENTOR.
GORDON E CHILDS
BY
ATTORNEY.

July 14, 1964  G. E. CHILDS  3,140,906
APPARATUS FOR FLASHING LAMP FILAMENTS
Filed Feb. 14, 1961  6 Sheets-Sheet 2

INVENTOR.
GORDON E. CHILDS.
BY
ATTORNEY.

July 14, 1964  G. E. CHILDS  3,140,906
APPARATUS FOR FLASHING LAMP FILAMENTS
Filed Feb. 14, 1961  6 Sheets-Sheet 5

INVENTOR.
GORDON E. CHILDS
BY
ATTORNEY.

July 14, 1964  G. E. CHILDS  3,140,906
APPARATUS FOR FLASHING LAMP FILAMENTS
Filed Feb. 14, 1961  6 Sheets-Sheet 6

INVENTOR.
GORDON E. CHILDS.
BY
ATTORNEY.

United States Patent Office 3,140,906
Patented July 14, 1964

3,140,906
APPARATUS FOR FLASHING LAMP FILAMENTS
Gordon E. Childs, Pompton Plains, N.J., assignor to Westinghouse Electric Corporation, East Pittsburgh, Pa., a corporation of Pennsylvania
Filed Feb. 14, 1961, Ser. No. 99,331
11 Claims. (Cl. 316—27)

The present invention relates to apparatus for manufacturing tubular incandescent lamps, and more particularly to a method of, and apparatus for, flashing the filaments of such lamps. This application is a continuation-in-part of application Serial No. 30,269, filed May 19, 1960, by G. E. Childs and assigned to the assignee of the present invention, and now abandoned.

The flashing of a tungsten incandescent lamp filament (to set the filament and thus provide the desired strength against sagging at high temperatures) is accomplished by the heating of the filament to the temperature of tungsten recrystallization, which temperature is about 3200° K. Heretofore in the case of a quartz infrared lamp of the type shown in U.S. Patent No. 2,883,571, issued April 21, 1959, to E. G. Fridrich et al., the method of and apparatus for flashing the horizontally and longitudinally disposed filament of such lamp (to prevent sagging during the flashing operation) was that shown in U.S. Patent No. 2,832,661, issued April 29, 1958, to E. H. Wiley. In such a lamp, the filament is maintained under oxygen-free conditions.

This conventional method of and apparatus for flashing a lamp filament is complicated, expensive to construct and to maintain and is not readily installed at a work station of a conventional indexable lamp-finishing machine.

It is the general object of the present invention to avoid and overcome the foregoing and other difficulties of and objections to prior art practices by the provision of an improved method of and apparatus for flashing of lamp filaments and for preventing the sagging thereof during the flashing operation.

Another object of the present invention is the provision of an improved apparatus for flashing lamp filaments, which apparatus is simple in structure, inexpensive to build and to maintain and which can be readily incorporated in an automatic lamp-finishing machine.

The aforesaid objects of the present invention, and other objects which will become apparent as the description proceeds, are achieved by providing filament-flashing apparatus comprising lamp supporting means, electrical means connected to the lamp for passing a flashing current through the filament and a magnetic-field-producing means disposed about the supported lamp for exerting an upward force on the filament thereby preventing sagging of the current-carrying filament during the flashing operation. The method of setting a coiled metallic filament (which method is carried out by hand or the various apparatus herein described) comprises the steps of supporting said lamp and locating said filament transversely in a magnetic field, and passing a current through said filament and raising said filament to its temperature of recrystallization, thus permitting the force on the current-carrying filament exerted by said magnetic field at right angles to both the motion of said current and the direction of said magnetic field to cancel the force of gravity on said current-carrying filament and thereby preventing sagging of said current-carrying filament during setting thereof.

For a better understanding of the present invention reference should be had to the accompanying drawings, wherein like numerals of reference indicate similar parts throughout the several views and wherein.

Although the principles of the present invention are broadly applicable to the flashing of lamp filaments, the present invention is particularly adapted for the flashing of horizontally and longitudinally disposed filaments of quartz infrared lamps and hence it has been so illustrated and will be so described.

Figure 1:
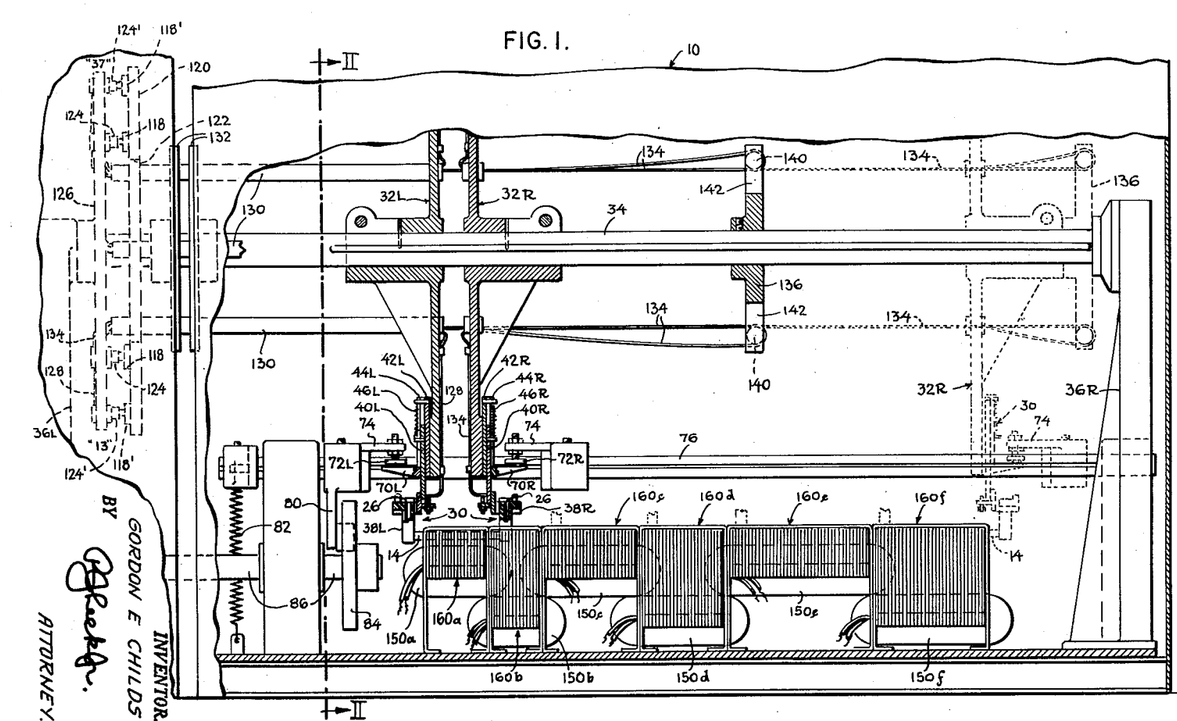
FIG. 1 is a fragmentary side-elevational view, partially in section, of a lamp-finishing machine for flashing the filaments of quartz infrared lamps and for seasoning such lamps and showing the flashing station of such lamp-finishing machine with the improved filament-flashing apparatus of the present invention disposed thereat.
Figure 2:
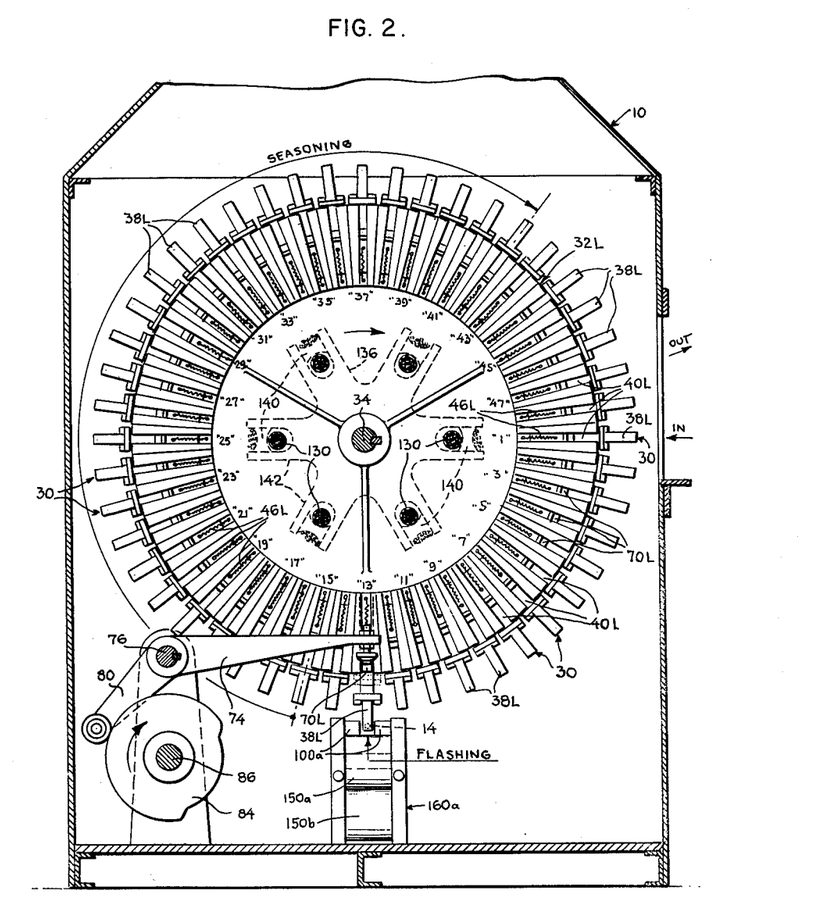
FIG. 2 is an end-elevational view of the lamp-finishing machine along the line II—II of FIG. 1 in the direction of the arrows.

With specific reference to the form of the present invention illustrated in the drawings, and referring particularly to FIGS. 1 and 2, a lamp-finishing machine is indicated generally by the reference numeral 10. This lamp-finishing machine 10 is utilized for flashing a filament 12 (FIG. 9) of a quartz infrared lamp 14 and for seasoning such quartz infrared lamp 14.

Figure 9:
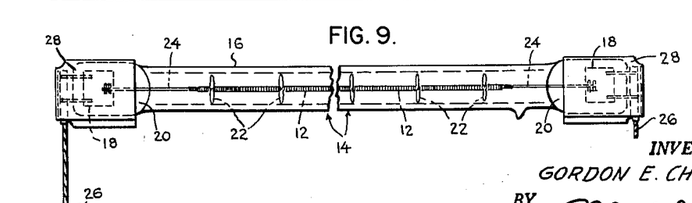
FIG. 9 is a side-elevational view of a quartz infrared lamp which is flashed by the improved method of and apparatus for flashing such lamps and which is seasoned on the lamp-finishing machine.

As shown in FIG. 9, this quartz infrared lamp 14 has an elongated tubular envelope 16 of quartz with the filament 12 extending along the longitudinal axis thereof and connected at each end to a ribbon 18 which is hermetically sealed to a flattened seal portion 20 of the envelope 16. The filament 12 is supported at spaced intervals along its length by discs 22 which are secured to the filament as disclosed in U.S. application Serial No. 861,861, filed December 24, 1959, by William L. Brundige et al., now Patent No. 2,980,820, and assigned to the assignee of the present invention. At each end of the quartz infrared lamp 14, a pair of inner lead wires 24 are connected to the ribbon 18 and project from the flattened seal portion 20 for connection to a rigid portion of an outer lead wire 26. This outer lead wire 26 also has a flexible portion extending from a base 28 which encases the flattened seal portion 20, inner lead wires 24, and the rigid portion of the outer lead wire 26.

As shown in FIG. 2 such quartz infrared lamp 14 is manually loaded (as indicated by the arrow and associated legend "IN") into a head 30 of the lamp-finishing machine 10 at Station "1," which lamp-finishing machine 10 and its operation will now be described.

*Lamp-Finishing Machine*

Figure 7:
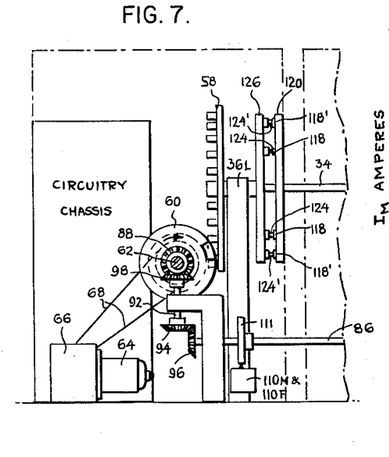
FIG. 7 is a diagrammatic view of the indexing means for the lamp-finishing machine and the drive means for the head-reciprocating mechanism, which diagrammatic view serves as a continuation of the left-hand portion of FIG. 1.

Referring now to FIGS. 1 and 2, it will be noted that the lamp-finishing machine 10 comprises essentially a pair of wheel-like conveyors 32R and 32L which are keyed to a shaft 34 journalled in pedestals 36R and 36L shown in FIGS. 1 and 7. One of the conveyors 32R is movable longitudinally along the shaft 34 and can be secured thereto in any desired position between the solid-line position and the dotted-line position shown in FIG. 1 to accommodate any length of quartz infrared lamp 14. A plurality of lamp holders 38R and 38L (forty-eight are shown in FIG. 2) are mounted in equi-spaced relation on the periphery of the conveyors 32R and 32L respectively with each registering pair of lamp holders 38R and 38L aligned parallel to the shaft 34 to constitute a head 30 for reception of a quartz infrared lamp 14 at Station "1" (FIG. 2).

Figure 3:
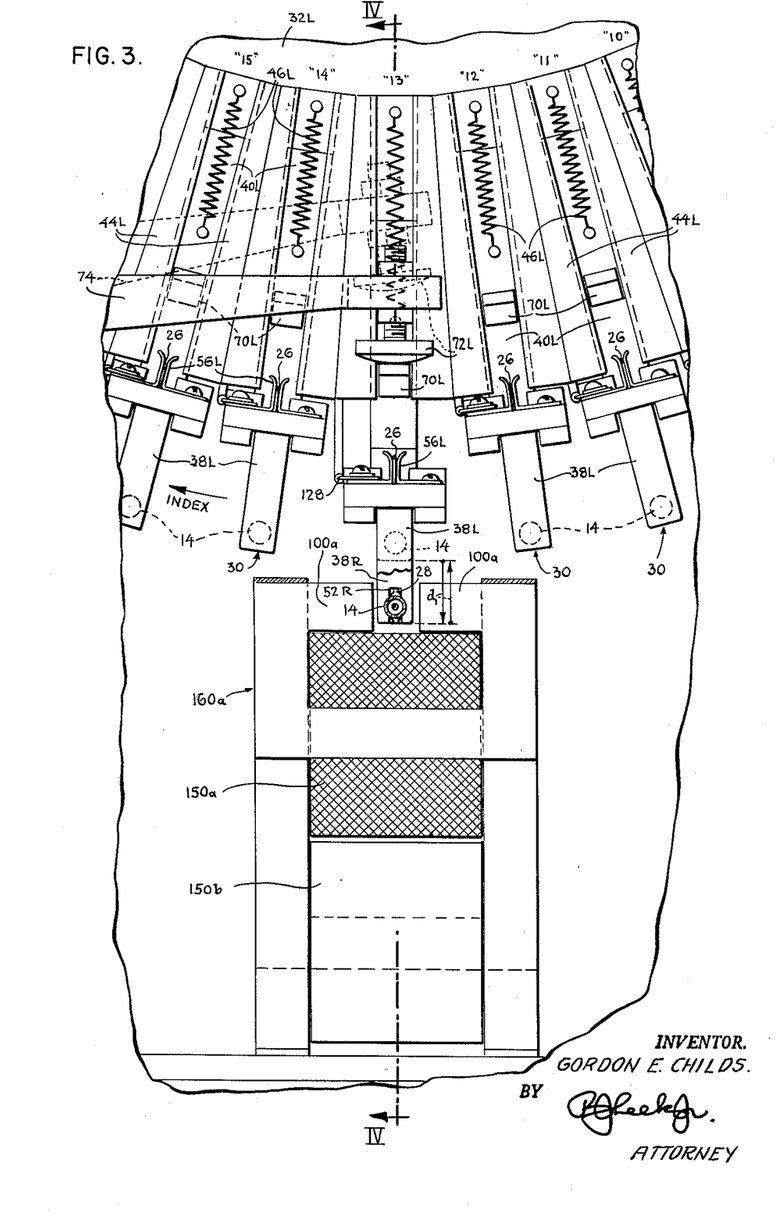
FIG. 3 is an enlarged fragmentary vertical-sectional view along the line III—III of FIG. 4 in the direction of the arrows.

Since the lamp holders 38R and 38L (FIGS. 1 and 4) are identical it is deemed sufficient to describe the lamp holders 38L, which are shown in FIGS. 2 and 3. It will be understood however that the reference numerals shown in the drawings and followed by the reference letter "R" refer to elements identical to those referred to in the following description and followed by the reference letter "L." Further, in this instance the suffix reference letters "L" and "R" indicate elements on the left and right side respectively of FIG. 1.

In order to permit radial reciprocating movement of each lamp holder 38L, such lamp holder 38L is mounted on a slide 40L (FIGS. 1 and 4) which is retained by a retaining plate 44L in a suitable guide slot in a guide 42L (affixed to the conveyor 32L). So that the lamp holder 38L will be retained in its normally "IN" position shown at Station "1" (FIG. 2) within the guide slot, such slide 40L is biased radially inwardly by a tension spring 46L to the position shown in FIG. 2 as determined by the engagement of an adjustable stop 48L (FIG. 4, carried by the lamp holder 38L) with the conveyor 32L.

Figure 4:
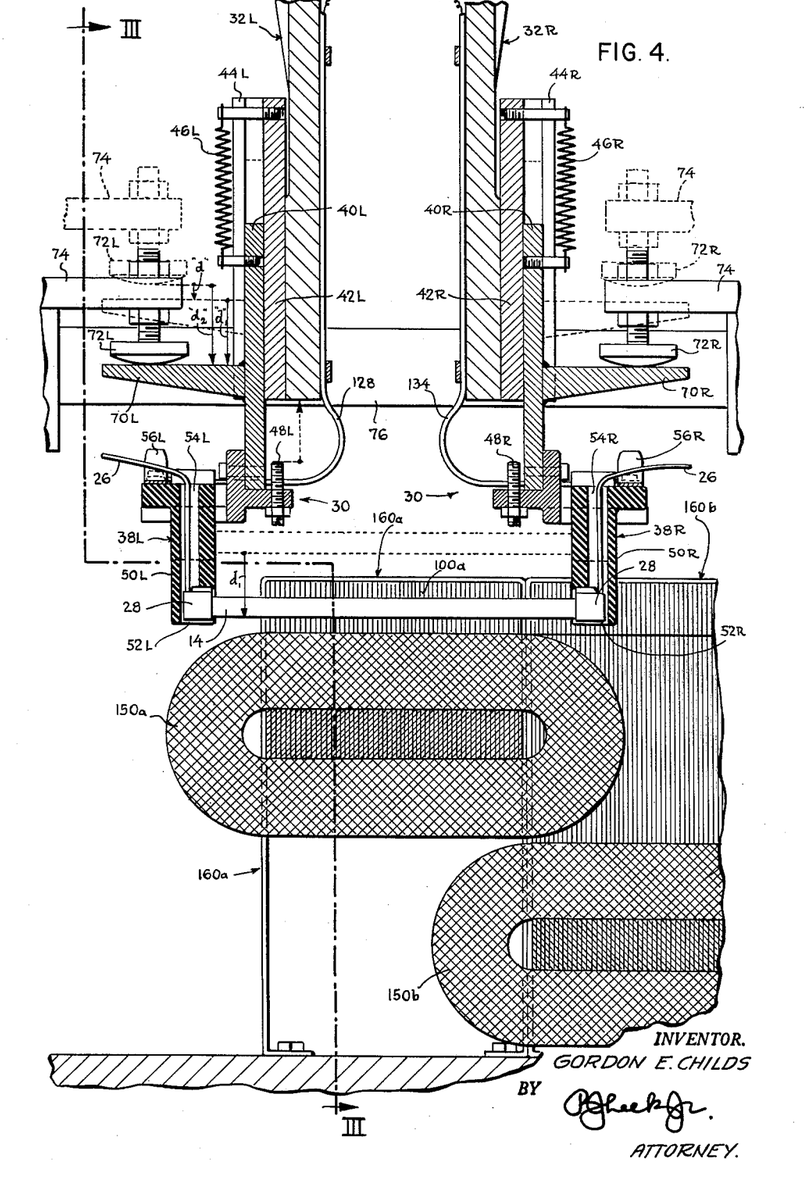
FIG. 4 is a vertical-sectional view along the line IV—IV of FIG. 3 in the direction of the arrows.

As shown in FIG. 4, each lamp holder 38L comprises an electrically insulated body 50L provided with a base-receiving slot 52L and a lead-wire clearance slot 54L. In order to manually load the quartz infrared lamp 14 into the lamp holders 38R and 38L of the head 30 at Station "1," the flexible portions of the outer lead wires 26 are fed through the base-receiving slots 52R and 52L and the lead-wire clearance slots 54R and 54L. The protruding end portions of such outer lead wires 26 are first pulled taut to seat the bases 28 in the base-receiving slots 52R and 52L and are then secured in spring clips 56R and 56L, which serve the dual function of securing the bases 26 in the base-receiving slots 52R and 52L and of functioning as electrical connections for introducing flashing and seasoning current to the quartz infrared lamp 14 as hereinafter explained.

Thereafter, the now loaded head 30 at Station "1" is indexed in clockwise direction, as viewed in FIG. 2, from work station to work station by an indexing mechanism (FIG. 7).

*Indexing Mechanism*

In order to achieve this indexing movement of the now loaded head 30, a conventional indexing wheel 58 (FIG. 7) is mounted on the shaft 34 adjacent the pedestal 36L and is driven by an indexing cam 60 mounted on a stud shaft 62. The drive means for the indexing cam 60 comprises a motor 64, an associated gear reduction unit 66 and a belt drive 68 connecting the stud shaft 62 to the gear reduction unit 66.

Continued operation of this indexing mechanism indexes the now loaded head 30 and the quartz infrared lamp 14 carried thereby through idle Stations "2"–"12" (FIG. 2) and into Station "13," the filament-flashing station, where the reciprocable head 30 and the quartz infrared lamp 14 are moved radially from their heretofore normally "IN" position (by a head-reciprocating mechanism, FIGS. 1–4) to the position shown in FIGS. 1–4 and into operative relationship with respect to a magnetic-field-producing apparatus disposed adjacent Station "13," preparatory for the filament-flashing operation.

*Head Reciprocating Mechanism*

When the head 30 indexes into Station "13," the filament-flashing station, pull-down arms 70R and 70L on the slides 40R and 40L respectively pass beneath and into registry with shoes 72R and 72L of the head-reciprocating mechanism, which shoes 72R and 72L are then disposed in the dotted-line positions shown in FIG. 4 a distance "$d$" above the final dwell (dotted-line) positions of the pull-down arms 70R and 70L.

As shown in FIGS. 1–4, the shoe 72R is adjustably mounted on an arm 74 which is adjustably keyed to a rock shaft 76 (FIG. 1) journalled in pedestals 78R and 78L. The shoe 72L is adjustably carried by one end of a lever 80 fixedly keyed to the rock shaft 76, with a roller on the other end of the lever 80 being biased by a spring 82 (FIG. 1) into engagement with a cam 84 on a stud shaft 86. In order to utilize the aforementioned stud shaft 62 (FIG. 7) as the drive means for the shaft 86, a bevel gear 88 on such stud shaft 62 drives a bevel gear 90 on a shaft 92, which shaft 92 then drives the shaft 86 by means of a bevel gear 94 on the shaft 92 and a bevel gear 96 on the shaft 86.

After the head 30 and the quartz infrared lamp 14 carried thereby have indexed into Station "13," the filament-flashing station, the cam 84 rotates the lever 80, the rock shaft 76, the arm 74 and shoes 72R and 72L in clockwise direction, as viewed in FIGS. 2 and 3, against the action of spring 82 (FIG. 1) so that such shoes 72R and 72L first move downwardly a distance "$d$" (FIG. 4) into engagement with the pull-down arms 70R and 70L. Thereafter such shoes 72R and 72L, the now engaged pull-down arms 70R and 70L and the head 30 continue downwardly together (against the action of the springs 46R and 46L) a distance "$d_1$" (FIGS. 3 and 4) from the dotted-line position (FIG. 4) to the solid-line position shown therein, thus disposing the head 30 and quartz infrared lamp 14 transversely between pole pieces 100a (FIG. 3) of the magnetic field-producing apparatus. During this downward movement the shoes 72R and 72L have travelled a total distance "$d_2$" (i.e. "$d+d_1$," FIG. 4). The quartz infrared lamp 14 which is now disposed in the horizontal, solid-line position shown in FIGS. 3 and 4 is now prepared for the simultaneous energization of a "filament-flashing" circuit (FIGS. 5 and 6) and a "magnetic-field-producing" circuit for the performance of the filament-flashing operation. In the following description the reference numerals followed by suffix reference letters "F" and "M" indicate similar elements associated with the "filament-flashing" circuit and "magnetic-field-producing" circuit respectively.

*Filament-Flashing Circuit*

Figure 5:
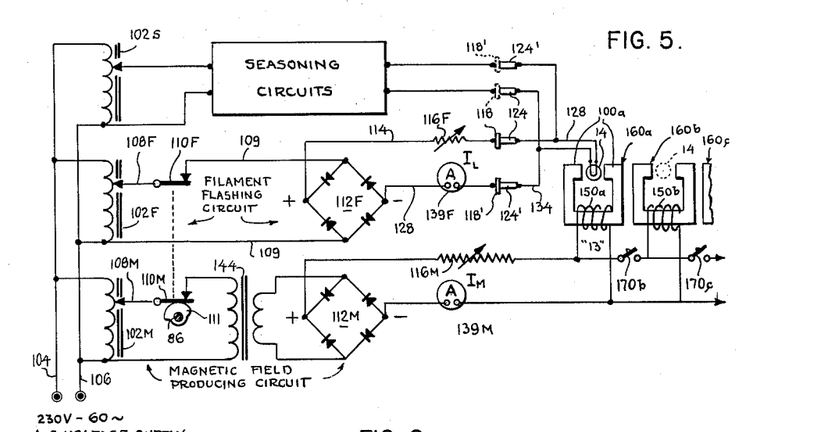
FIG. 5 is a wiring diagram of the "lamp-seasoning" circuits (which are rendered inoperative at the filament-flashing station), and the "filament-flashing" circuit and the "magnetic-field-producing" circuit at the filament-flashing station, both of which latter circuits use direct current.

In the direct-current embodiment of the "filament-flashing" circuit shown in FIG. 5, a variable voltage transformer 102F is connected across line voltage conductors 104 and 106 which extend from a suitable line voltage source indicated by the legend " 230 v.-60 cycle A.C. Voltage Supply." An output tap 108F of the variable voltage transformer 102F is connected by a line 109 to a cam-operated switch 110F (closable by a cam 111, FIG. 7, on the shaft 86) and thence to the input side of a full-wave rectifier bank 112F and then back to the variable voltage transformer 102F.

A conductor 114 extends from the positive output side of the rectifier bank 112F through a variable resistor 116F to a segmental commutator ring 118 on a stator 120 (FIG. 1) mounted on the frame of the lamp-finishing machine 10 and provided with a central clearance aperture 122. Adjacent Station "13" the segmental commutator ring 118 is of course electrically conducting. Forty-eight brushes 124 (one for each head 30) are carried by a rotor 126 mounted on the shaft 34 and such brushes 124 ride on the segmental commutator ring 118.

In order to connect the brush 124 at Station "13" with quartz infrared lamp 14 at such station, an input cable 128 extends from such brush 124 through the central aperture 122 and a cable-carrying conduit 130 (mounted on cable-supporting discs 132, FIG. 1, affixed to the shaft 34 and the fixed conveyor 32L) to the spring clip 56L.

To provide a return connection for the quartz infrared lamp 14 to the negative side of the rectifier bank 112F, first an output cable 134 extends from the spring clip 56R around a cable take-up device 136 (FIGS. 1 and 2), through the cable-carrying conduit 130 to a brush 124' on the rotor 126, which brush 124' rides on a second segmental commutator ring 118' on the stator 120. The segmental commutator ring 118' is then connected by a line 128 (FIG. 5) through an ammeter 139F (indicating lamp current in amperes) to the negative side of the rectifier bank 112F.

It will be understood from a consideration of FIGS. 1 and 2 that each of the six cable-carrying conduits 130 carries eight such input cables 128 and eight such return cables 134, which eight pairs of cables service eight adjacent heads 30.

Further, as shown in FIGS. 1 and 2, the adjustably mounted cable take-up device 136 comprises a radially flanged wheel adjustably mounted on the shaft 34 to take up the slack in the six sets of eight return cables 134. Each of such six sets of eight return cables 134 pass around a roller 140 mounted in an arm 142 of the cable take-up device 136.

Closure of the gang-operated switch 110F and a switch 110M (FIG. 5) in the "magnetic-field-producing" circuit by the cam 111 on the shaft 86 simultaneously energizes the "filament-flashing" circuit and the "magnetic-field-producing" circuit.

*Magnetic-Field-Producing Circuit*

In the embodiment of this "magnetic-field-producing" circuit shown in FIG. 5, a variable voltage transformer 102M is disposed across the line-voltage conductors 104 and 106 and has its output tap 108M connected through the cam-operated switch 110M to one side of the primary of a step-down transformer 144, with the other side of such primary being returned to the voltage divider 102M. The secondary of the step-down transformer 144 is paralleled with a rectifier bank 112M, the positive output terminal of which rectifier bank 112M being joined through a variable resistor 116 M to one side of the coil 150a of a first electromagnet 160a of the magnetic-field-producing apparatus. A suitable line extends from the other side of the coil 150a through an ammeter 139M (for indicating magnet current in amperes) to the negative side of the rectifier bank 112M.

In order to accommodate quartz infrared lamps 14 of greater length than the lamp 14 shown in FIGS. 1 and 4, coils 150b, 150c etc. of other electromagnetics 160b, 160c, etc. respectively (shown in FIG. 1 and diagrammatically in FIG. 5) can be placed in parallel with the coil 150a of the first electromagnet 160a and energized by manual closure of switches 170b, 170c, etc. respectively.

Having described the "magnetic-field-producing" circuit which constitutes the major portion of the "magnetic-field-producing" apparatus the description of such apparatus will now be completed.

*Magnetic-Field-Producing Apparatus*

As shown in FIGS. 1 and 4, the magnets 160a, 160b, etc. have different lengths and are positioned adjacent each other to accommodate the various lengths of the different types of quartz infrared lamps 14. Additionally, in order to provide a continuous uniform magnetic field along each longitudinal horizontally-disposed filament 12, the coil 150b, for example, of magnet 160b is disposed below (and also slightly overlaps) the coils 150a and 150c of adjacent magnets 160a and 160c respectively.

Closure of the gang-operated switches 110F and 110M by the cam 111, as hereinbefore mentioned, simultaneously energizes the "filament-flashing" circuit and the "magnetic-field-producing" circuit. Energization of the "filament-flashing" circuit causes a current to flow through the filament 12 to raise it to its temperature of recrystallization while the latter circuit enables the magnetic-field-producing apparatus to provide a magnetic field around the filament 12. The force on the current-carrying filament 12, exerted by the magnetic field at right angles to both the motion of the current and the direction of the magnetic field cancels the force of gravity on such filament 12 during the filament-flashing operation, will now be explained in detail.

The filament 12 (which for purposes of illustration only will be assumed to be a filament for use in a 500 watt quartz infrared lamp 14) has the following characteristics:

| | |
|---|---|
| Wire diameter | 0.0091" or .0231 cm. |
| Filament I.D. | 0.044" or 0.112 cm. |
| Filament t.p.i. | 88.7. |
| Filament t.p. cm. | 34.9. |
| Wt. of filament | 0.117 gram/cm. |

Hence, the magnetic field produced by the magnetic-field-producing apparatus must exert an upward force of 0.117 gram/cm.×980 or 114.66 dynes/cm. The length of tungsten wire/cm. in the filament 12 is $(\pi)$ (filament I.D. in cm.) (turns/cm.) or $(\pi)$ (0.112) (34.9)=12.23 cm. of tungsten wire in 1 cm. of filament length. As a result the required upward force in dynes/cm. of length of tungsten wire is $$\frac{114.66}{12.23}$$

or 9.36 dynes/cm. of tungsten wire.

As is well known in the art, the force (F) in dynes exerted by a magnetic field or a current-carrying conductor is related to the density of the magnetic field (B) in gausses; the current in the conductor $(I_L)$ in amperes; and a constant K by the following formula:

$$F = K I_L B$$

Figure 8:
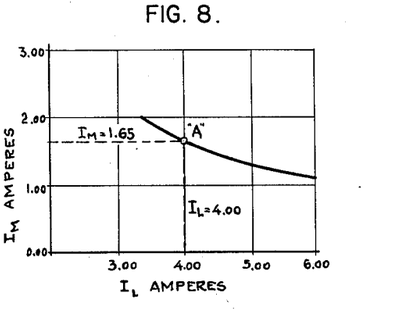
FIG. 8 is a graph of the magnet current ($I_M$) in amperes versus lamp current ($I_L$) in amperes.

Since in the instant case the conventional current carrying conductor is replaced by the helix-shaped filament 12 disposed perpendicular to the magnetic field, the constant K is fairly complex and was determined experimentally by reading the magnet current $(I_M)$ on the ammeter 139M and the lamp current $(I_L)$ on the ammeter 139F immediately prior to the point of lift of the filament 12 by the magnetic field. These results are shown in FIG. 8.

The magnetic field intensity (B) in gausses is obtained from the magnetic current $(I_M)$ in amperes by the following relationship:

$$B = \frac{360 \times I_M}{4 \times 2.0213} = 44.5258(I_M)$$

where

360=No. of turns in the magnet 160a
4=inches in the length of the pole pieces 100a
2.0213=No. of ampere turns in 1 gauss absolute In the calculation of the constant K the force (F) in dynes exerted by the magnetic field was considered as 9.36 dynes/cm. of tungsten wire in the filament 12.

Hence $$K \text{ (calculated) equals } \frac{9.36}{I_L B} \text{ or } \frac{9.36}{I_L(44.5258)I_M}$$

As an example it will be noted from FIG. 8 that equilibrium is obtained at point "A" on the curve $I_L=4.0$ and $I_M=1.65$, whence $$K=\frac{9.36}{(4.0)(44.5258)(1.65)}=.0318 \text{ or approximately } \frac{1}{10\pi}$$

After a predetermined scheduled period of time (as determined by the cam 111), the gang-operated switches 110F and 110M are opened by the cam 111 thus deenergizing the "filament-flashing" circuit and "magnetic-field-producing" circuit. The flashed filament 12 is now sufficiently recrystallized to permit further flashing under the full force of gravity at Station "14" if desired. The spring 82 of the head-reciprocating mechanism and the springs 46R and 46L of the head 30 then cause retraction of such head-reciprocating mechanism, the head 30 and the now-flashed quartz infrared lamp 14 carried thereby from the solid-line position shown in FIGS. 1–4 to the dotted-line position shown in FIGS. 3 and 4, preparatory for the indexing movement of the head 30 to Station "14," a normally idle station, which may be employed for further filament-flashing to complete recrystallization of the filament 12.

From Station "15" through Station "42" the quartz infrared lamp 14 is seasoned by operation of a plurality of "lamp-seasoning" circuits, FIG. 5.

*Lamp-Seasoning Circuits*

These "lamp seasoning" circuits, one for each seasoning station, each comprise a variable-voltage transformer 102S (FIG. 5) connected across the line-voltage conductors 104 and 106 and also to the input side of the individual "seasoning" circuit (indicated by the legend "Seasoning Circuits"). The output side of the "seasoning" circuit is joined to a conducting segment of the hereinbefore mentioned commutator rings 118 and 118' and then through the brushes 124 and 124' respectively to the quartz infrared lamp 14.

At Station "47," the discharge station, the outer lead wires 26 of the now flashed and seasoned quartz infrared lamp 14 are removed from the spring clips 56R and 56L and the lamp 14 taken out of the head 30.

It will be recognized by those skilled in the art that the objects of the present invention have been achieved by the provision of an improved method of and apparatus for flashing lamp filaments and for preventing the sagging of such filaments during the flashing operation. This apparatus is simple in structure, inexpensive to build and to maintain and can be readily incorporated in an automatic lamp-finishing machine. The improved filament flashing method of the present invention provides a magnetic field around the lamp filament during the flashing thereof, which magnetic field cancels the force of gravity on the longitudinal horizontally disposed filament. The improved filament-flashing apparatus comprises a lamp supporting means, filament-flashing means connected to the lamp for passing the flashing current through the filament and a magnetic-field-producing apparatus disposed about the supported lamp for exerting an upward force on such filament to cancel the force of gravity thereon and thereby prevent sagging of the current-carrying filament during the flashing operation.

Figure 6:
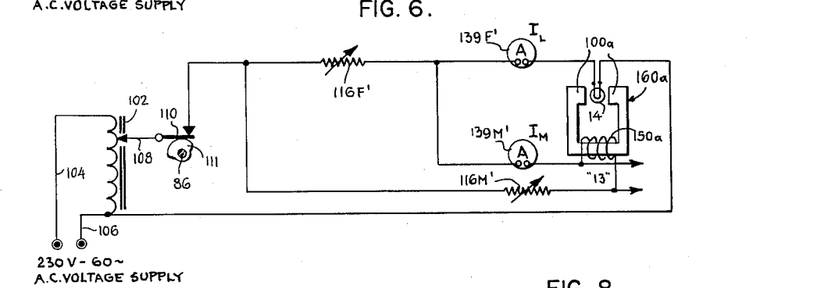
FIG. 6 is a view similar to FIG. 5 of an alternative embodiment of the "filament-flashing" circuit and the "magnetic-field-producing" circuit using alternating current therein.

As an alternative embodiment of the "filament-flashing" circuit and "magnetic-field-producing" circuit, reference is made to FIG. 6 wherein a variable voltage transformer 102 is shown disposed across the line-voltage conductors 104 and 106. An output tap 108 of such variable-voltage transformer 102 is connected to a switch 110 closable by operation of the cam 111 on the shaft 86. The "magnetic-field-producing" circuit is disposed in parallel about a variable resistor 116F' in the "filament-flashing" circuit and comprises the variable resistor 116M', the coil 150a of the first magnet 160a and an ammeter 139M' (for reading the magnetic current in amperes) and the filament 12 of the quartz infrared lamp 14.

Figure 10:
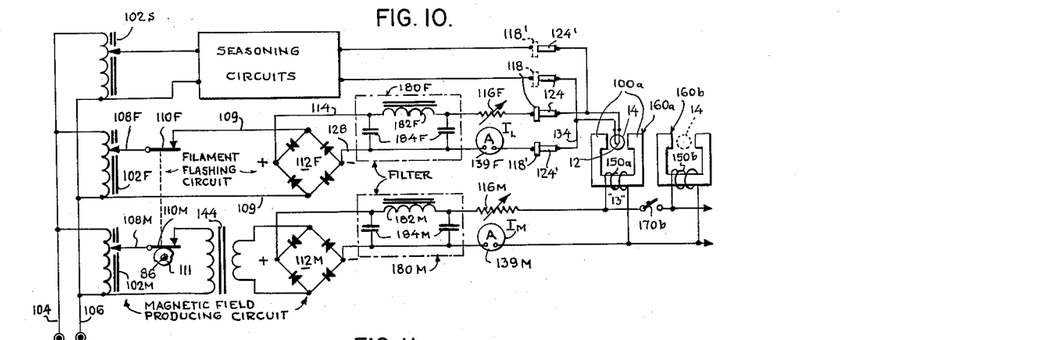
FIGS. 10–13 are views similar to FIGS. 5 and 6 of alternative embodiments of the circuits shown in FIGS. 5 and 6.

In order to provide a uniform flashing current and a uniform magnetic field with resultant substantial elimination of vibration of the filament 12 during the flashing operation, the "filament-flashing" circuit and "magnetic-field-producing" circuit are provided, as shown in FIG. 10, with a ripple or smoothing filter 180F and 180M respectively. These ripple filters 180F and 180M comprise respectively a smoothing choke 182F and 182M and a pair of by-pass or filter condensers 184F and 184M.

Figure 11:
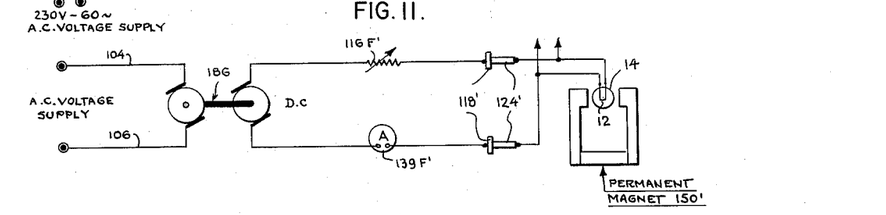

As shown in FIG. 11, vibration of the filament 12 during the flashing operation is completely eliminated by the use of a motor generator unit 186 to provide ripple free D.C. current to the filament 12 and by the use of a permanent magnet 150' to provide a uniform magnetic field. The permanent magnet 150' (FIG. 11) is also used to replace the "magnetic-field-producing" circuits shown in FIGS. 5, 6 and 10.

Alternatively, a "filament-flashing" circuit (FIG. 12) is employed, having a delta-connected three-phase primary 188 of a star-connected polyphase fullwave rectifier 190, which primary 188 is connected by conductors 104', 106', and 107' to a suitable "A.C. Supply." A star-connected secondary 192 of such rectifier 190 is connected through rectifiers, such as diodes 194, in the usual manner to the lamp filament 12. This type of "filament-flashing" circuit provides an economical circuit. To further eliminate the ripple in the rectified alternating current, a ripple or smoothing filter 180F', smaller than the filter 180F (FIG. 10), is employed.

Figure 12:
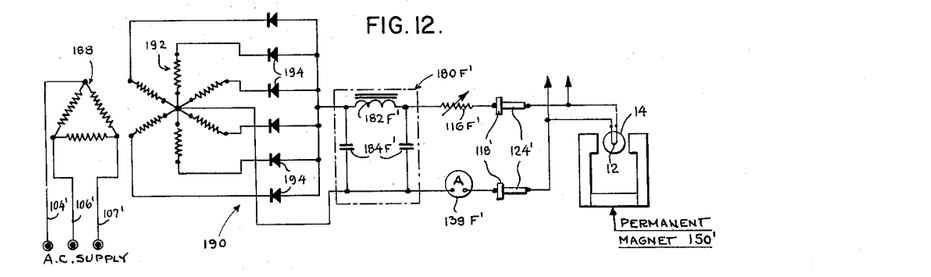
Figure 13:
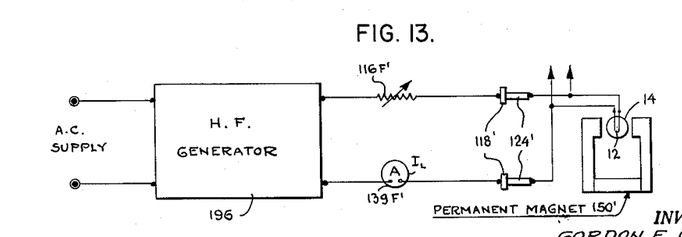

Further, the "filament-flashing" circuit, shown in FIG. 1, utilizes a high-frequency generator 196 which is operable at a frequency which is more than five times the natural frequency of the unsupported sections of the filament 12 (i.e. between the discs 22, FIG. 9), the natural frequency of the filament 12 being calculated from conventional elastic beam formulas. The "filament-flashing" circuits shown in FIGS. 11–13 are also used as substitutes for the "filament-flashing" circuits (shown in FIGS. 5, 6 and 10).

While in accordance with the patent statutes a preferred embodiment of the present invention has been illustrated and described in detail it is to be particularly understood that the invention is not limited thereto or thereby.

I claim:

1. Apparatus for processing an electric lamp by setting a coiled metallic filament contained within the envelope of said lamp and having a substantial unsupported length, said apparatus comprising a plurailty of electromagnets, each having its respective coil in overlapping arrangement with the coil of an adjacent electromagnet and its pole pieces aligned in abutting engagement with the pole pieces of the adjacent electromagnet to define a gap corresponding to the longitudinal disposition of said filament and thus provide a uniform magnetic field across said pole pieces, lamp-supporting means adjacent said electromagnets for supporting said lamp and for locating said filament transversely in said uniform magnetic field produced by said electromagnets, and filament-flashing means connected to said lamp for passing a current through said filament and raising said filament to its temperature of recrystallization, thus permitting the force on the current-carrying filament exerted by said uniform magnetic field at right angles to both the motion of said current and the direction of said uniform magnetic field to cancel the force of gravity on said current-carrying filament and thereby preventing sagging of said current-carrying filament during setting thereof.

2. Apparatus for processing an electric lamp by setting a coiled metallic filament contained within the envelope of said lamp and having a substantial unsupported length, said lamp having a base on each end thereof with a flexible lead extending from each of said bases, said apparatus comprising a magnetic-field-producing means, a pair of lamp holders adjacent said magnetic-field-producing means, each lamp holder being provided with a first aperture for receiving a base and a second aperture in communication with said first aperture for receiving a flexible lead and having means for securing said flexible lead thereby supporting said lamp and locating said filament transversely in a magnetic field produced by said magnetic-field-producing means, and filament-flashing means connected to said lamp for passing a current through said filament and raising said filament to its temperature of recrystallization, thus permitting the force on the current-carrying filament exerted by said magnetic field at right angles to both the motion of said current and the direction of said magnetic field to cancel the force of gravity on said current-carrying filament and thereby preventing sagging of said current-carrying filament during setting thereof.

3. Apparatus for processing an electric lamp by setting a coiled metallic filament contained within the envelope of said lamp and having a substantial unsupported length, said apparatus comprising an electromagnet, power means connected to said electromagnet for energizing the latter, lamp-supporting means adjacent said electromagnet for locating said filament transversely in a magnetic field produced by said electromagnet, filament-flashing means connected to said lamp, and control means connected to said power means and said filament-flashing means for simultaneously causing said filament-flashing means to pass a current through said filament and raising said filament to its temperature of recrystallization and for causing said power means to energize said electromagnet thereby permitting the force on the current-carrying filament exerted by said magnetic field at right angles to both the motion of said current and the direction of said magnetic field to cancel the force of gravity on said current-carrying filament and thereby preventing sagging of said current-carrying filament during setting thereof.

4. Apparatus for processing an electric lamp by setting a coiled metallic filament contained within the envelope of said lamp and having a substantial unsupported length, said lamp having a base on each end thereof with a flexible lead wire extending from each such base, said apparatus comprising a plurality of electromagnets, each having its respective coil in overlapping arrangement with the coil of an adjacent electromagnet and its pole pieces aligned in abutting engagement with the pole pieces of the adjacent electromagnet to define a gap corresponding to the longitudinal disposition of said filament and thus provide a uniform magnetic field across said pole pieces, a pair of lamp holders adjacent said electromagnets, each lamp holder being provided with a first aperture for receiving a base and a second aperture in communication with said first aperture for receiving a flexible lead wire and having means for securing said flexible lead wire thereby supporting said lamp and locating said filament transversely in said uniform magnetic field produced by said electromagnets, and filament-flashing means connected to said lamp for passing a current through said filament and raising said filament to its temperature of recrystallization thus permitting the force on the current-carrying filament exerted by said uniform magnetic field at right angles to both the motion of said current and the direction of said uniform magnetic field to cancel the force of gravity on said current-carrying filament and thereby preventing sagging of said current-carrying filament during setting thereof.

5. Apparatus for processing an electric lamp by setting a coiled metallic filament contained within the envelope of said lamp and having a substantial unsupported length, said lamp having a base on each end thereof with a flexible lead wire extending from each such base, said apparatus comprising an electromagnet, power means connected to said electromagnet for energizing the latter, a pair of lamp holders adjacent said electromagnet, each lamp holder being provided with a first aperture for receiving a base and a second aperture in communication with said first aperture for receiving a flexible lead wire and having means for securing said flexible lead wire, thereby supporting said lamp and locating said filament transversely in a magnetic field produced by said electromagnet, filament-flashing means connected to said lamp, and control means connected to said power means and said filament-flashing means for simultaneously causing said filament-flashing means to pass a current through said filament and raise said filament to its temperature of recrystallization and for causing said power means to energize said electromagnet, thus permitting the force on the current-carrying filament exerted by said magnetic field at right angles to both the motion of said current and the direction of said magnetic field to cancel the force of gravity on said current-carrying filament and thereby preventing sagging of said current-carrying filament during setting thereof.

6. Apparatus for processing an electric lamp by setting a coiled metallic filament contained within the envelope of said lamp and having a substantial unsupported length, said apparatus comprising magnetic-field-producing means, a filtering means connected to said magnetic-field-producing means for providing a uniform magnetic field, lamp-supporting means adjacent said magnetic-field-producing means for supporting said lamp and for locating said filament transversely in said uniform magnetic field produced by said magnetic-field-producing means, and filament-flashing means connected to said lamp for passing a current through said filament and raising said filament to its temperature of recrystallization, thus permitting the force on the current-carrying filament exerted by said uniform magnetic field at right angles to both the motion of said current and the direction of said uniform magnetic field to cancel the force of gravity on said current-carrying filament and thereby preventing sagging of said current-carrying filament during setting thereof.

7. Apparatus for processing an electric lamp by setting a coiled metallic filament contained within the envelope of said lamp and having a substantial unsupported length, said apparatus comprising magnetic-field-producing means, lamp-supporting means adjacent said magnetic-field-producing means for supporting said lamp and for locating said filament transversely in said uniform magnetic field produced by said magnetic-field-producing means, and filament-flashing means and a filtering means connected to said lamp for passing a substantially ripple free current through said filament and raising said filament to its temperature of recrystallization, thus permitting the force on the current-carrying filament exerted by said uniform magnetic field at right angles to both the motion of said current and the direction of said uniform magnetic field to cancel the force of gravity on said current-carrying filament and thereby preventing sagging of said current-carrying filament during setting thereof.

8. Apparatus for processing an electric lamp by setting a coiled metallic filament contained within the envelope of said lamp and having a substantial unsupported length, said apparatus comprising a permanent magnet, lamp-supporting means adjacent said permanent magnet for supporting said lamp and for locating said filament transversely in a magnetic field produced by said permanent magnet, and filament-flashing means connected to said lamp for passing a current through said filament and raising said filament to its temperature of recrystallization, thus permitting the force on the current-carrying filament exerted by said magnetic field at right angles to both the motion of said current and the direction of said magnetic field to cancel the force of gravity on said current-carrying filament and thereby preventing sagging of said current-carrying filament during setting thereof.

9. Apparatus for processing an unrecrystallized filament having a substantial unsupported length, in order to recrystallize said filament, said apparatus comprising, magnetic-field-producing means for generating a magnetic field of predetermined direction and strength, means for maintaining said filament under oxygen-free conditions, positioning means for placing said filament in predetermined position and substantially transverse to the magnetic field generated by said magnetic-field-producing means, filament-flashing means adapted to be connected to said filament to pass through said filament an electric current having a predetermined direction with respect to the direction of the magnetic field generated by said magnetic-field-producing means and a predetermined magnitude sufficient to heat said filament to its temperature of recrystallization, and means for simultaneously energizing for a predetermined period of time said magnetic-field-producing means and said filament-flashing means to exert upon said filament an upward force sufficient to substantially offset the force of gravity on said filament.

10. Apparatus for processing an electric lamp having an unrecrystallized coiled filament having a substantial unsupported length, said apparatus comprising, magnetic-field-producing means for generating a magnetic field of predetermined direction and strength, lamp-supporting means adjacent to said magnetic-field-producing means for supporting said lamp and placing said filament in predetermined position and substantially transverse to the magnetic field generated by said magnetic-field-producing means, filament-flashing means adapted to be connected to said filament to pass through said filament an electric current having a predetermined direction with respect to the direction of the magnetic field generated by said magnetic-field-producing means and a predetermined magnitude sufficient to heat said filament to its temperature of recrystallization, and means for simultaneously energizing for a predetermined period of time said magnetic-field-producing means and said filament-flashing means to exert upon said filament an upward force sufficient to substantially offset the force of gravity on said filament.

11. Apparatus for processing an electric lamp having an unrecrystallized coiled filament having a substantial unsupported length, said apparatus comprising, a magnetic-field-producing means for generating a unidirectional magnetic field of predetermined direction and strength, lamp-supporting means adjacent to said magnetic-field-producing means for supporting said lamp and placing said filament in horizontal position and substantially transverse to the magnetic field generated by said magnetic-field-producing means, filament-flashing means adapted to be connected to said filament to pass through said filament a unidirectional electric current having a predetermined direction with respect to the direction of the magnetic field generated by said magnetic-field-producing means and a predetermined magnitude sufficient to heat said filament to its temperature of recrystallization, and means for simultaneously energizing for a predetermined period of time said magnetic-field-producing means and said filament-flashing means to exert upon said filament an upward force sufficient to substantially offset the force of gravity on said filament.

References Cited in the file of this patent

UNITED STATES PATENTS

| | | |
|---|---|---|
| 263,141 | Edison | Aug. 22, 1882 |
| 1,955,794 | Du Mont et al. | Apr. 24, 1934 |
| 2,435,475 | Stromeyer | Feb. 3, 1948 |
| 2,804,365 | Flowers | Aug. 27, 1957 |
| 2,832,661 | Wiley | Apr. 29, 1958 |
| 2,961,285 | Hardwick | Nov. 22, 1960 |
| 2,978,286 | Nick | Apr. 4, 1961 |

FOREIGN PATENTS

| | | |
|---|---|---|
| 1,211,215 | France | Oct. 5, 1959 |